United States Patent [19]

Hilpert et al.

[11] Patent Number: 4,743,888
[45] Date of Patent: May 10, 1988

[54] DEVICE FOR DETECTING A TRAILER COUPLED ONTO A TRACTOR VEHICLE

[75] Inventors: Wolfgang Hilpert, Stuttgart; Gerhard Komander, Aich Wald, both of Fed. Rep. of Germany

[73] Assignee: Daimler-Benz Aktiengesellschaft, Stuttgart, Fed. Rep. of Germany

[21] Appl. No.: 877,365

[22] Filed: Jun. 23, 1986

[30] Foreign Application Priority Data

Jun. 22, 1985 [DE] Fed. Rep. of Germany ....... 3522481

[51] Int. Cl.⁴ .............................................. G08B 21/00
[52] U.S. Cl. .................................... 340/540; 340/687; 362/61
[58] Field of Search ................... 340/687, 76, 99, 110, 340/540; 362/61

[56] References Cited

U.S. PATENT DOCUMENTS

| | | | |
|---|---|---|---|
| 3,059,105 | 10/1962 | Roe et al. | 362/61 |
| 3,710,370 | 1/1973 | Quilici et al. | 340/687 |
| 3,792,432 | 2/1974 | Ellis et al. | 340/687 |
| 4,106,081 | 8/1978 | Turturici | 362/61 |
| 4,286,309 | 8/1981 | Rasinski | 362/61 |
| 4,430,637 | 2/1984 | Koch-Ducker et al. | 340/687 |
| 4,593,264 | 1/1986 | Engle | 340/687 |

FOREIGN PATENT DOCUMENTS 3038464 3/1983 Fed. Rep. of Germany .

Primary Examiner—John W. Caldwell, Sr.
Assistant Examiner—Richard Hjerpe
Attorney, Agent, or Firm—Barnes & Thornburg

[57] ABSTRACT

A device for detecting a trailer coupled onto a tractor vehicle which, incorporates the rear or brake or license plate illuminating lights of the trailer and by corresponding combination of the signals applied at a logic element, an output signal for triggering the indication "trailer coupled" is achieved.

3 Claims, 1 Drawing Sheet

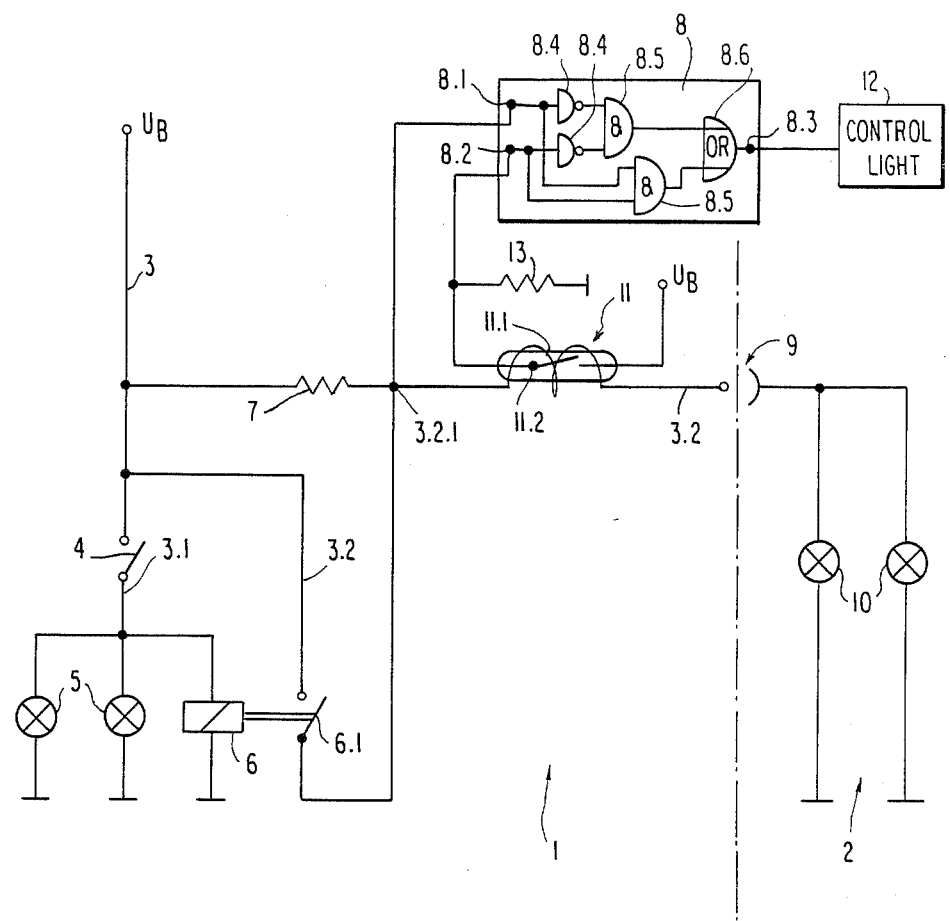

DEVICE FOR DETECTING A TRAILER COUPLED ONTO A TRACTOR VEHICLE

BACKGROUND AND SUMMARY OF THE INVENTION

The invention relates to a device for detecting a trailer coupled onto a tractor vehicle with a switch and a relay which can be activated by this switch being provided in the tractor vehicle, by means of which switch lights of the tractor vehicle can be switched via a first line and corresponding lights of the trailer can be switched via a second line, with an input of a logic element being connected to a branching point in the second line, which branching point is located between the lights, the logic element then transmits a signal at its output when the trailer is coupled on, and with a resistance being connected between battery voltage and the branching point, which resistance is of high value compared with the resistance of the trailer lights.

A generic device is already known (German Patent Specification No. 3,038,464) which is based on the fundamental principle that the low-resistance direction-indicator lights in the trailer lower the 1-signals at a logic element to a 0-signam and therefore trigger an indication. The switching arrangement shown, however, presupposes that lights continuously applied to earth are used, which is only the case with the direction-indicator lights.

The object of the invention is to provide a generic device in such a way that it can be used in all light circuits, irrespective of whether these lights are switched on continuously in operation.

This operation is achieved according to the invention wherein a switch is also at battery voltage ($U_B$), in the closed condition of which a switch contact of an activated relay bridges a resistance and a coil of a second switch is switched into a second line between a branching point and lights, which second switch on one side, is also connected to battery voltage ($U_B$) and, on the other side, is connected to a second input of a logic element.

Another object of the invention is a device for detecting when a trailer is coupled onto a vehicle, with a first switch and a relay which can be activated by the first switch being provided in the vehicle, by means of which switch lights of the tractor vehicle can be switched via a first line and corresponding lights of the trailer can be switched via a second line, with an input of a logic means connected to a branching point in said second line, which branch point is located between an electrical source and said trailer lights, which logic means transmitting a signal at its output when the trailer is electrically coupled to the vehicle between a battery voltage and the branching point and is of high value compared with the resistance of the trailer lights, wherein the first switch is also at battery voltage in a closed condition and a switch contact of the relay bridges the resistance, a coil of a second switch is switched into the second line between the branching point and the trailer lights, when second switch is also connected between battery voltage and a second input of the logic element.

It is another object of the invention to provide a device for indicating electrical status of an electrical socket on a vehicle comprising switch means for connecting at least a vehicle light and a first relay to an electrical source, a branch point, a resistance means connected between said electrical source and said branch point, second switch means responsive to said first relay for connecting the branch point to said electrical source, second relay means responsive to a voltage between said branch point and said electrical socket on said vehicle to provide an output, and logic means responsive to a potential at said branch point and to said output to generate an indicating signal.

It is another object of the invention to provide a device for indicating electrical status of an electrical socket on a vehicle comprising switch means for connecting at least a vehicle light and a first relay to an electrical source, a branch point, a resistance means connected between said electrical source and said branch point, second switch means responsive to said first relay for connecting the branch point to said electrical source, second relay means responsive to a voltage between said branch point and said electrical socket on said vehicle to provide an output, and logic means responsive to a potential at said branch point and to said output to generate an indicating signal wherein an electrical socket on a trailer is connected to said electrical socket on said vehicle and further comprising at least a trailer light connected to said electrical socket on said trailer and responsive to said first switch means.

The foregoing and other objects, features and advantages of the present invention will become more apparent from the following description when taken in connection with the accompanying drawing which shows, for the purposes of illustration only, one embodiment in accordance with the present invention, and wherein like reference numerals are used to designate like parts.

BRIEF DESCRIPTION OF THE DRAWING

The single drawing FIGURE is a schematic diagram of a preferred embodiment of the present invention.

DETAILED DESCRIPTION OF THE DRAWING

In the drawing, the circuit part of the device in the tractor vehicle is designated as 1 and the circuit part in the trailer is designated as 2. In the circuit part 1, a switch 4, such as the brake light switch, the rear light switch or the license plate switch, is located in a line 3 connected to the positive pole of the vehicle battery, in the closed condition of which switch 4 the corresponding lights 5, applied to earth, in the tractor vehicle are switched on via the line 3.1. Moreover, a relay 6, parallel to the lights 5, is applied to earth and is likewise activated in the closed condition of the switch 4, so that its switch contact 6.1 is closed and a resistance 7 located between the line 3 and the branching point 3.2.1 is bridged via a line 3.2. A first input 8.1 of a logic element 8 is connected to the branching point 3.2.1 in the line 3.2 and, the line 3.2 leads further from this branching point 3.2.1 to a trailer socket 9 and from the latter to the corresponding lights 10 in the trailer. Connected into the line section of the line 3.2, which line section leads from the branching point 3.2.1 to the trailer socket 9, is the coil 11.1 of a further switch 11, preferably a reed relay, the switch contact 11.2 of which is likewise connected between the positive pole of the vehicle battery and a second input 8.2 of the logic element 8. A resistor 13 connects second input 8.2 to earth. The logic element 8 has in turn an output 8.3, via which a signal can be drawn for triggering an indication, for example, a control light 12.

The components of the logic element 8 may comply with the following logic schedule:

(a) The trailer is coupled onto the tractor vehicle
(a1) Switch 4 is not closed
   Input 8.1 has 0-signal
   Input 8.2 has 0-signal
   Output 8.3 has 1-signal
(a2) Switch 4 is closed
   Input 8.1 has 1-signal
   Input 8.2 has 1-signal
   Output 8.3 has 1-signal
(b) Trailer is not coupled onto tractor vehicle
(b1) Switch 4 is not closed or
(b2) Switch 4 is closed
   Input 8.1 has 1-signal
   Input 8.2 has 0-signal
   Output 8.3 has 0-signal This logic schedule can be carried out, for example, by the combination shown of inverters 8.4, AND element 8.5 and OR element 8.6.

If condition (a) and (a1) exists, a 0-signal is applied at the input 8.1, because the battery voltage drops via resistance 7—for example 1 kiloohm—which is relatively high value compared with the resistance of the lights 10; a 0-signal is also applied at the input 8.2, because the current flowing in the line 3.2 and through the coil 11.1 is not adequate to close the switch contact 11.2 of the switch 11; consequently, a 1-signal is applied at the output 8.3, which leads to the triggering of the indication "trailer coupled".

If the condition (a) and (a2) exists, a 1-signal is now in fact applied at the input 8.1, because the resistance 7 is bridged via the switch contact 6.1 and therefore the battery voltage is applied at the input 8.1 and a 1-signal is now also applied at the input 8.2, because the current determined by the trailer lights 10 and flowing through the coil 11.1 is adequate for closing the switch contact 11.2; however, because of the combination of the two input signals, a 1-signal is also applied at the output 8.3, which maintains the indication "trailer coupled".

If the condition (b) and (b1) exists, a 1-signal is applied at the input 8.1, because the battery voltage is applied at this input as a result of the interrupted circuit to the trailer; on the other hand, a 0-signal is applied at the input 8.2, because the switch contact 11.2 is not closed; a 0-signal is now present at the output 8.3, which does not lead to any triggering of an indication and means "trailer not coupled".

The same is also the case when the conditions (b) and (b2) exists, because a 1-signal continues to be applied at the input 8.1—as a result of the battery voltage applied via the switch contact 6.1—and a 0-signal continues to be applied at the input 8.2 as a result of the switch contact 11.2 which is not closed.

Since, in the case of the trailer lights 10 employed, at least two lights are always connected in parallel, the function of the device is still ensured even when a light fails.

While we have shown and described only one embodiment in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A device for detecting when a trailer is coupled onto a vehicle, with a first switch and a relay connected to said first switch and which can be activated by the first switch being provided in the vehicle, by means of which switch lights of the tractor vehicle can be switched via a first line connected between said first switch and said switch lights and corresponding lights of the trailer can be switched via a second line connected between said first switch and said trailer lights, with an input of a logic means connected to a branching point in said second line, said branch point being located between an electrical source and said trailer lights, a resistance being connected between a battery voltage and said branch point, said resistance being of high value compared with the resistance of said trailer lights, said logic means transmitting a signal at its output when the trailer is electrically coupled to the vehicle and when said resistance is connected between said battery voltage and the branching point, wherein the first switch is also at battery voltage in a closed condition and a switch contact of the relay bridges the resistance, a coil of a second switch is switched into the second line between the branching point and the trailer lights, which second switch is also connected between battery voltage and a second input of the logic element.

2. A device according to claim 1, wherein a trailer light activated in response to said first switch comprises one of a brake, rear or license plate light.

3. A device according to claim 1, wherein the second switch is a current relay.

* * * * *